Oct. 27, 1970   L. HYMES ET AL   3,535,908
INJECTION MOLDING OF SOLID METAL
Filed July 14, 1967   2 Sheets-Sheet 1

INVENTORS
LAWRENCE HYMES
DANIEL L. MEHL

BY  E. Ronald Coffman

ATTORNEY

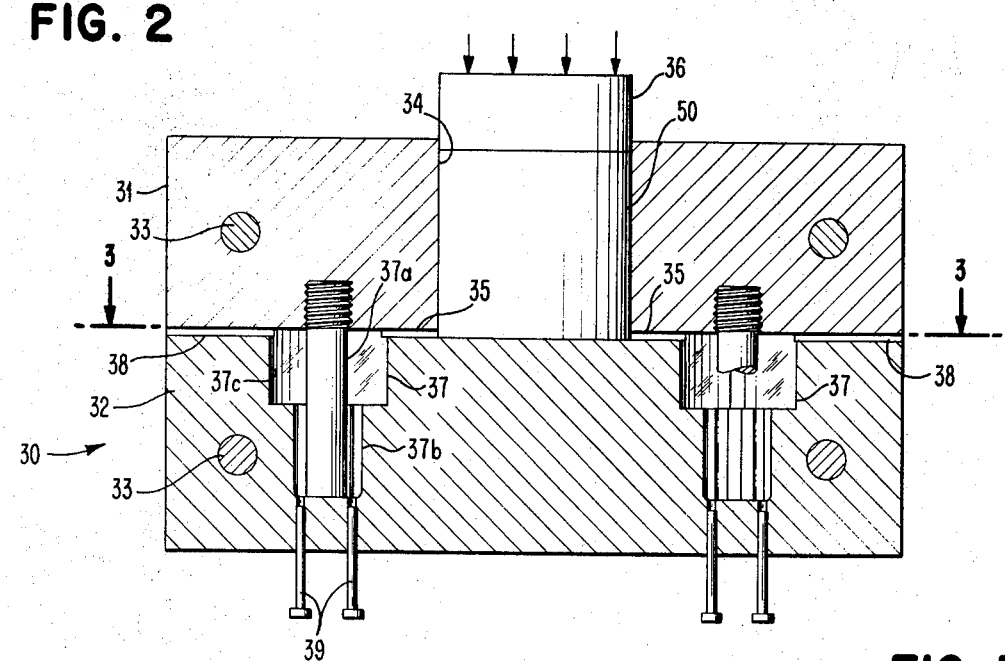
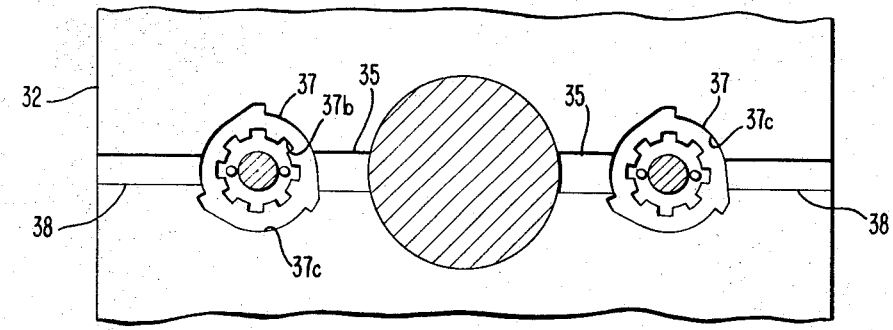
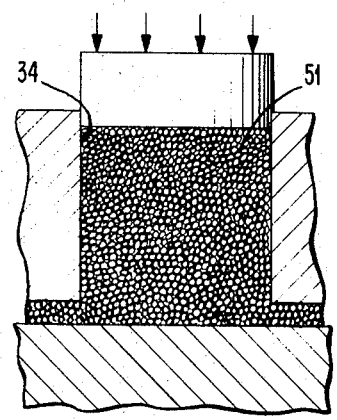
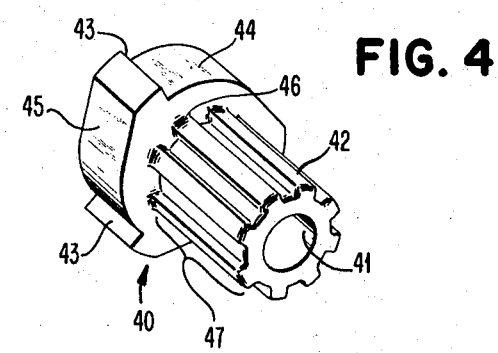

United States Patent Office 3,535,908
Patented Oct. 27, 1970

3,535,908
INJECTION MOLDING OF SOLID METAL
Lawrence Hymes and Daniel L. Mehl, Lexington, Ky., assignors to International Business Machines Corporation, Armonk, N.Y., a corporation of New York
Filed July 14, 1967, Ser. No. 653,396
Int. Cl. B21c 23/00
U.S. Cl. 72—364                          12 Claims

ABSTRACT OF THE DISCLOSURE

Solid metal is extruded through a restricted passageway to generate a ribbon of metal having a clean surface and a workable cross-section. The ribbon passes directly into a die cavity where it fills the cavity and is pressure welded into a structurally sound, solid body. By this method intricate metal parts are molded to dimensional tolerances and a surface finish usually obtainable only by machining.

Disclosure of the invention

Intricate metal shapes are normally manufactured by casting, machining, or forging, and often by combinations of these basic processes. The cost of making metal shapes, and indeed the ability to make certain shapes, is determined principally by the complexity of the particular shape, its lack of tolerance to dimensional variations, its requirements for structural integrity, and often its required surface finish. Our invention surpasses these conventional forming methods by achieving intricacies usually obtainable only by casting, together with the control of dimension and surface finish usually obtainable only by machining, and the grain characteristics obtainable by forging through the use of relatively simple and high throughput press equipment.

Our method is particularly useful with the so-called "superplastic" metals, such as the 78% zinc–22% aluminum eutectoid and the 88% aluminum, 12% silicon eutectic, as well as other known materials which normally possess broadly useful structural properties, but which are conditionable to a state of anomalously low strength or flow stress, usually at elevated temperature. A survey of such materials is set forth in an article entitled "A Review of Superplasticity and Related Phenomena" by Irving E. Underwood, published in the Journal of Metals, December, 1962, pp. 914–919. Some typical "superplastic" materials were identified therein as follows (percentages are by weight):

20% aluminum, 80% zinc
67% aluminum, 33% copper
88.3% aluminum, 11.7% silicon
62% copper, 38% zinc
59% copper, 41% zinc
52% copper, 48% zinc The low flow stress of these materials at their forming temperature permits their formation by our method with reasonably sized presses and without significant deflection or deterioration of the die material itself.

Our method requires metal to be maintained in a solid, wholly crystalline phase before, during, and after its formation and thereby is distinguished from casting processes wherein metal is also injected through a restricted orifice or passageway. Casting procedures, as characterized by processes involving liqud metal or noncrystalline materials in some portion of the shape forming operation, suffer from a fundamental inability to maintain geometric integrity. Typical die casting practice recognizes an inability to maintain critical tolerances of one inch sections within ±0.010 in., whereas parts molded by our invention can be maintained within tolerances of ±0.003 in. in similar sections.

Several factors must be considered in understanding this fundamental limitation on casting procedures. First, the change of material from a liquid to a solid phase is characterized by relatively large changes in specific volume resulting in localized part shrinkage or change from the dimension of the die itself.

Second, parts of complex shape transfer heat at varied rates and thus induce temperature gradients through the part. Such temperature gradients are aggravated by the exothermic nature of the solidification process whereby large sections will remain substantially at the solidus temperature while small sections, being already solidified and to some extent thermally isolated from the larger sections, continue to cool. The die in which the formed part is required to at least partially cool imposes localized loadings on the part in reaction to differential shrinkage and thermal contraction. Residual stresses are thus induced in the part at room or working temperature and these residual stresses can distort the part. If subsequent machining operations are required to obtain the final shape, the residual stresses are redistributed by the removal of material and the distortion is thereby aggravated. Parts as cast cannot be expected to have optimum physical characteristics and it is usual to perform a subsequent heat treatment for property enhancement. The heat treatment may relieve some residual stresses and, depending upon the nature of the part, either increase or decrease the distortion caused thereby.

The casting procedures thus can be compared with our method which deals in purely solid crystalline metal, which is directly formed to precise dimension and surface characteristics including polished surfaces. It is particularly significant that our process does not require cooling as an essential step in the forming process per se.

Our process may be summarized as follows: A mold having one or more precision cavities and having appropriate temperature or other environmental control mechanisms associated therewith is provided with, and characterized principally by, a restricted passageway for injection of metal into the cavities. A plurality of cavities can be fed from a common metal supply through independent passageways if desired. Solid metal stock, either in the form of a unitary billet or of grains or pellets is then injected through the gate or gates into the die cavity. As the metal passes through the gate passageways, it is converted into a ribbon of relatively small section which can be deformed by bending and folding internally of the die to fill most of the mold cavity. The ribbon is characterized by its new or unoxidized clean exterior surface which permits successful pressure welding of the metal to itself and also permits intimate contact of the metal with the die surfaces. Polished surfaces of between five and six microns CLA have successfully been formed directly on zinc-aluminum parts by this method. Pressure is continued on the material deforming it finally into intimate contact with the die and pressure welding the deformed ribbon into a structurally sound solid body having a wrought grain structure.

The part thus formed is then removed from the die and may require heat treatment to optimize its structural characteristics.

The foregoing objects, features and advantages of our invention will be more apparent from the following description of some specific embodiments of our invention and some examples of complex parts actually formed, wherein reference is made to the accompanying drawings, of which:

FIGS. 2 and 3 are respective front and top cross-sectional view of a typical molding installation for performing the molding process of our invention.

FIG. 4 is a perspective view of a typical complex part that is formed in the die cavities of the apparatus shown in FIGS. 2 and 3.

FIG. 5 is a partial front cross-sectional view of an alternative use of the equipment shown in FIG. 2.

Figure 1A:
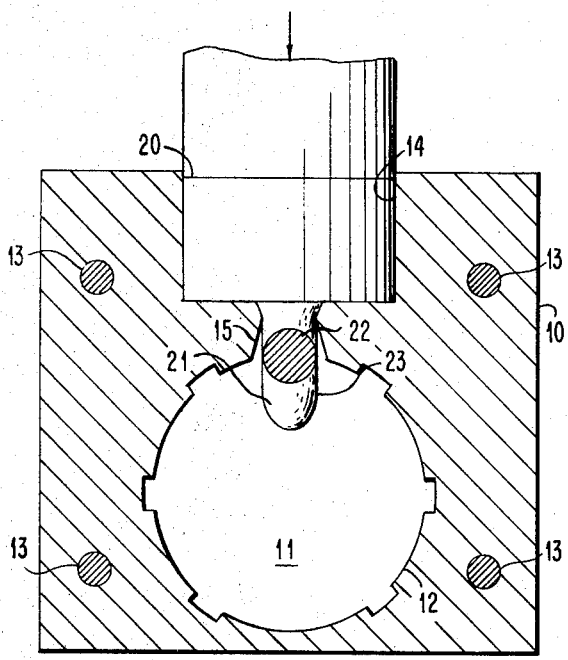
FIGS. 1a, 1b and 1c are progressive operational views of our forming process illustrating certain unique characteristics thereof.

In FIG. 1a there is shown a die 10 having a cavity 11 defined by a surface 12 that is configured complementary to the shape desired to be formed. The die 10 is provided with environmental control in the form of resistance heaters 13 by which the temperature of the die and material therewithin can be maintained as required for optimum performance. A stock metal reservoir 14 is connected to die cavity 11 through restricted gate passageway 15 which serves to convert stock metal 20 from the reservoir 14 into a ribbon 21 having a cross-section 22 that is relatively weak and having an exterior surface 23 that is free of contaminants. Since the ribbon 21 moves directly into the cavity 11 and the gate passageway 15 is closed to oxygen or other contaminants, the claim surface 23 is retained on the ribbon 21 to enhance later pressure welding of the ribbon on itself and to assure intimate contact of the material with the die cavity surface 12.

Figure 1B:
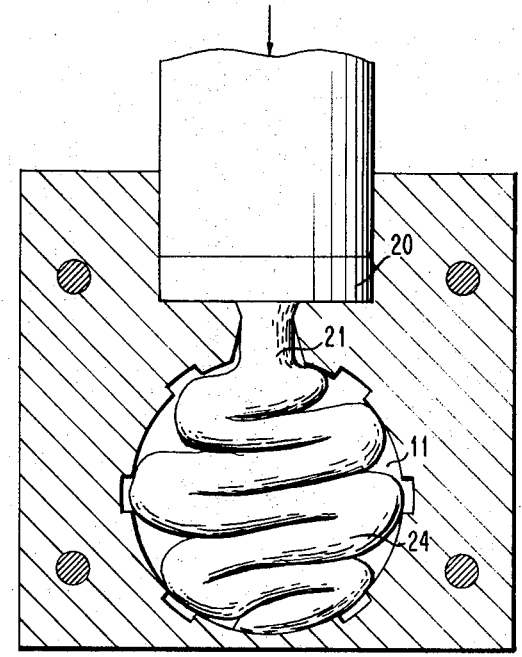

FIG. 1b shows an intermediate stage of operation wherein the ribbon 21 has moved into the cavity 11 and then has been deformed by bending into a bulk 24 that occupies a major portion of the cavity.

Figure 1C:
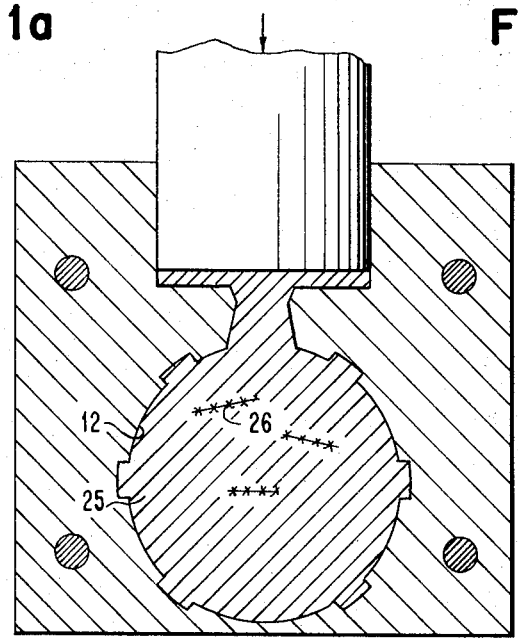

In FIG. 1c, a final stage of the operation, the bulk 24 has been compressed into a solid body 25 and against the cavity surface 12 to receive the shape and surface finish thereof as permitted particularly by the fresh unoxidized and uncontaminated surface of the ribbon as described above. Lines 26 represent typical weld lines where the ribbon 21 has been folded upon itself and welded into a unitary body.

It can be seen that the metal as formed in our process is made flowable by an intermediate shaping operation i.e. the ribbon forming step rather than by a phase change operation as in casting. The "flowable" nature of the ribbon permits the formation of a preform bulk of a shape very roughly approximating the final shape to minimize the amount of bulk deformation and localized loadings required to produce the final shape. By this method we have formed parts as complex as the character element for an IBM "Selectric" typewriter. A similar character element for example is shown in U.S. Pat. 3,027,988 to T. B. Tackett, issued Apr. 3, 1962, and entitled "Printing Device."

A more specific example of apparatus employed in our process is shown in FIGS. 2–4. In FIG. 2 there is shown a mold assembly 30 having an upper half 31, a lower half 32, heating means such as electrical resistance rods 33, a metal supply chamber 34 and force delivery means such as a drive piston 36. Force requirements for the shapes shown is in the order of 30 tons on a two-inch diameter billet of conditioned superplastic Zn–Al alloys at about 520° F. Mold half 32, as shown also in FIG. 3, includes a plurality of precision die cavities 37 which are connected to supply chamber 34 by individual restricted gate passageways 35. Our method permits the use of multiple cavities more conveniently than simple forging of independent billets inasmuch as it is immaterial whether one of our cavities is completely formed before another, since metal will continue to flow until all cavities are formed. The cavities 37 are shaped substantially complimentary to the part or metallic shape 40 to be formed as shown in FIG. 4. Vent passageways 38 allow escapement of trapped air from the cavities 37. Ejection pins 39 force the part 40 from the mold after it is formed.

The typical part 40 is characterized by several manufacturing complexities. It includes a central bore 41 that is formed by a core member 37a mounted on the upper mold half 31. Gear teeth 42 on the part 40 are designed to receive a rubber timing belt and thus must have both a precision dimension and a surface finish that does not cause excessive wear on the timing belt. The desired surface finish is formed internally on the die cavity lower portion 37b as shown in FIGS. 2 and 3, and is transferred to the part during formation such that additional surface finishing operations are not required.

Surface finish is also important on latch engaging surfaces 43 which must slidably engage a control latch blade. Roughness of surface 43 could cause a misoperation. Again, the surface characteristic desired is transferred from the die to the part without further operation. For purposes of illustration, surface 44 is formed to a polished finish simply by providing a corresponding polished surface 37c with die cavity 37.

The latch engaging surfaces 43 are part of a relatively heavy section 45 of the part 40 and are directly connected at a fairly sharp transition section 46 to a comparatively thin section 47 carrying the teeth 42. Normally in other metal forming processes the existence of such combined large and small sections raises great problems in distortion due to shrinkage. Distortion from our process is orders of magnitude less than that encountered where material is formed which is not totally solid at all times.

When dealing with a eutectoid such as zinc-aluminum, we prefer to overheat the parts after forming into a range of non-superplasticity to thereby increase their resistance to deformation. Certain parts are even overheated prior to ejection from the mold, however, such in-the-mold heat treating increases the effective cycle time. Ejection is accomplished by known means such as ejection pins 39 which are operated by conventional equipment not shown.

In FIG. 2 a solid or integral wholly crystalline stock metal billet 50 of metal such as a preconditioned superplastic material is shown in place ready to be formed. In FIG. 5 the metal supply cavity 34 is shown filled with pellet material 51 which functions equally well in molding according to our invention.

We have formed parts of an alloy comprising by weight 78% zinc–22% aluminum, and an alloy comprising by weight 88% aluminum–12% silicon. The zinc-aluminum was preconditioned by holding a billet at a temperature of about 600° F. for one hour, then quenching the billet in water with agitation to produce a metastable phase state. Forming temperature for the zinc-aluminum alloy is optimum in the range of 500° to 532° F. and cannot exceed 532° F. The aluminum-silicon alloy was preconditioned by chill casting a billet to produce a metastable phase state. Optimum forming temperature for the aluminum-silicon is in the range of 900 to 1040 degrees Fahrenheit.

Those skilled in the art will recognize that we have provided a new metal forming process by which parts of complex shapes are formed directly to "machined" tolerance and surface finish. While our invention is particularly useful when employed on so-called "superplastic" metals, it will be understood that other metals can be formed by our process as limited principally by its flow stress and the complexity of the part. Thus it can be seen that various modifications, additions, and deletions can be made to our invention concepts as defined in the appended claims.

We claim:

1. The process of making metallic shapes comprising the steps of:

providing a die including a cavity having a surface that is configured complmentary to the shape desired to be formed and a gate passageway of restricted cross-section in flow communication with said cavity, providing solid crystalline stock metal, heating said stock metal and said die to elevated temperatures, injecting said stock metal through said gate passageway into said cavity while maintaining it in a wholly solid crystalline phase, and pressure deforming the thus injected stock metal into intimate contact with said cavity surface and into a solid body.

2. The process of making metallic shapes as defined in claim 1 wherein said stock metal is selected from the class consisting of substantially, by weight:

22% aluminum–78% zinc
67% aluminum–33% copper
88% aluminum–12% silicon
62% copper–38% zinc
59% copper–41% zinc
52% copper–48% zinc 3. The process of making metallic shapes as defined in claim 1 wherein said stock metal comprises substantially 78% zinc–22% aluminum by weight, which has been preconditioned by quenching from a homogenous state at a temperature in excess of 532 degrees Fahrenheit, and said die and said stock metal are maintained at temperatures in the range of substantially 500 to 532 degrees Fahrenheit during said injecting step.

4. The process of making metallic shapes as defined in claim 1 wherein said stock metal comprises substantially 88% aluminum–12% silicon by weight which has been preconditioned by chill casting and said heating means maintains said die and said stock metal within the temperature range of 900 to 1040 degrees Fahrenheit.

5. The process of making metallic shapes as defined in claim 1 wherein said die cavity is provided with at least one polished die surface portion and whereby a complementary polished surface is formed on the shape.

6. The process of making metallic shapes as defined in claim 1 wherein said stock metal is provided in the form of a substantially integral billet.

7. The process of making metallic shapes in a die cavity having a surface that is configured complementary to the shape desired to be formed wherein the improvement comprises the steps of:

converting solid crystalline stock metal into a ribbon of workable cross-section from a substantially different original shape while limiting access of contaminates thereto, moving said ribbon directly into said cavity to fill a substantial portion thereof by bending deformation of said ribbon into a bulk, and pressure deforming the bulk into intimate contact with said cavity surface and into a solid body.

8. The process as defined in claim 1 wherein the further improvement comprises the additional step of:

controlling the environment of said metal during the entire process as defined to minimize the flow stress of the metal while maintaining the metal at all times in a solid crystalline phase.

9. The process as defined in claim 8 wherein said environmental control step comprises control of the metal temperature to maintain a temperature below the metal solidus limit.

10. The process as defined in claim 7 wherein said stock metal comprises an alloy comprising essentially by weight 78% zinc, 22% aluminum preconditioned by being held at a temperature in excess of 532 degrees Fahrenheit for at least one hour, being quenched to a metastable state, and being thereafter heated to a temperature substantially between 500 and 532 degrees Fahrenheit, wherein the improvement further comprises the step of:

maintaining the temperature of said metal during said converting, moving, and pressure deforming steps within the temperature range of 500 to 532 degrees Fahrenheit.

11. The process as defined in claim 7 wherein said stock metal comprises an alloy comprising essentially by weight 88% aluminum, 12% silicon which has been preconditioned by being quenched from a liquid phase to a metastable state and thereafter heating said metal to a temperature in the range of 900 to 1040 degrees Fahrenheit.

12. The process as defined in claim 7 wherein said stock metal is provided in the form of a unitary integral billet of cross-section substantially greater than the ribbon.

References Cited

UNITED STATES PATENTS

| | | |
|---|---|---|
| 2,287,277 | 6/1942 | Ryder. |
| 2,327,079 | 8/1943 | Wacker. |
| 2,389,169 | 11/1945 | Stacy. |
| 2,617,152 | 11/1952 | Rubin. |
| 3,340,101 | 9/1967 | Fields et al. _____ 148—11.5 |
| 3,002,614 | 10/1961 | Jones _____ 72—56 |

OTHER REFERENCES

"Superplasticity in an Al–Zn Alloy" by W. A. Backofen et al.; Transactions of the ASM; vol. 57, 1964; pp. 980—990.

"A Review of Superplasticity" by Ervin E. Underwood; Journal of Metals; December, 1962; pp. 914–919.

RICHARD J. HERBST, Primary Examiner

U.S. Cl. X.R.

29—471.1, 475